(12) United States Patent
Ingalls, Jr. et al.

(10) Patent No.: US 7,212,926 B2
(45) Date of Patent: May 1, 2007

(54) TESTING USING A NON-ENGINE BASED TEST SYSTEM AND EXHAUST PRODUCT COMPRISING ALTERNATIVE FUEL EXHAUST

(75) Inventors: Melvin Nathaniel Ingalls, Jr., San Antonio, TX (US); Gordon James Johnston Bartley, San Antonio, TX (US); Cynthia Chaffin Webb, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 456 days.

(21) Appl. No.: 10/917,230

(22) Filed: Aug. 12, 2004

(65) Prior Publication Data

US 2005/0039524 A1    Feb. 24, 2005

Related U.S. Application Data

(63) Continuation-in-part of application No. 10/213,890, filed on Aug. 6, 2002, now Pat. No. 7,140,874.

(51) Int. Cl.
*G01B 3/44* (2006.01)

(52) U.S. Cl. .................. 702/34; 702/184; 702/185

(58) Field of Classification Search .................. 702/34, 702/184, 185
See application file for complete search history.

(56) References Cited

U.S. PATENT DOCUMENTS

| | | | |
|---|---|---|---|
| 1,102,510 | A | 7/1914 | Irish |
| 3,030,773 | A | 4/1962 | Johnson |
| 3,131,749 | A | 5/1964 | Davis |

(Continued)

FOREIGN PATENT DOCUMENTS

DE          918699          7/1949

(Continued)

OTHER PUBLICATIONS

Proceedings of the Eighth CRC On-Road Vehicle Emissions Workshop, Apr. 20-22, 1998, vol. 2.

(Continued)

*Primary Examiner*—Michael Nghiem
*Assistant Examiner*—Stephen J. Cherry
(74) *Attorney, Agent, or Firm*—Baker Botts, L.L.P.

(57) ABSTRACT

A method for testing one or more test components including providing a non-engine based test system including a combustor in fluid communication with the one or more test components; supplying air and fuel to the combustor at an air to fuel ratio (AFR) and under feed conditions effective to produce a feedstream flowpath, wherein the fuel includes one or more alternative fuel which is gaseous at ambient conditions including atmospheric pressure and a temperature of about 20° C. or higher, the supplying air and fuel including feeding the one or more alternative fuel to a pressure regulator to produce one or more pressure regulated alternative fuel and feeding the one or more pressure regulated alternative fuel to the combustor; combusting at least a portion of fuel in the feedstream flowpath under combustion conditions effective to produce an exhaust product including one or more alternative fuel exhaust; and, exposing the one or more test components to the exhaust product under test conditions effective to produce one or more treated components.

20 Claims, 2 Drawing Sheets

U.S. PATENT DOCUMENTS

| | | |
|---|---|---|
| 3,176,751 A | 4/1965 | Gerlitz |
| 3,503,715 A | 3/1970 | Haensel |
| 3,630,024 A | 12/1971 | Hopkins |
| 3,685,740 A | 8/1972 | Sheperd |
| 3,694,135 A | 9/1972 | Dancy et al. |
| 3,818,846 A | 6/1974 | Reese |
| 3,890,088 A | 6/1975 | Ferri |
| 3,940,253 A | 2/1976 | Zetterström .................. 23/277 |
| 4,035,137 A | 7/1977 | Arand |
| 4,054,418 A | 10/1977 | Miller et al. |
| 4,118,171 A | 10/1978 | Flanagan et al. |
| 4,270,896 A | 6/1981 | Polinski |
| 4,383,411 A | 5/1983 | Riddel |
| 4,651,524 A | 3/1987 | Brighton |
| 4,845,940 A | 7/1989 | Beer |
| 4,878,380 A | 11/1989 | Goodman |
| 5,085,577 A | 2/1992 | Muller |
| 5,140,814 A | 8/1992 | Kreutmair et al. |
| 5,149,261 A | 9/1992 | Suwa et al. |
| 5,267,851 A | 12/1993 | Washam et al. |
| 5,288,021 A | 2/1994 | Sood et al. |
| 5,320,523 A | 6/1994 | Stark |
| 5,339,630 A | 8/1994 | Pettit |
| 5,396,794 A | 3/1995 | Nichols |
| 5,493,171 A | 2/1996 | Wood |
| 5,529,048 A | 6/1996 | Kurihara et al. |
| 5,553,450 A | 9/1996 | Schnaibel et al. |
| 5,584,178 A | 12/1996 | Naegeli et al. |
| 5,592,924 A | 1/1997 | Audisio |
| 5,626,014 A | 5/1997 | Hepburn et al. |
| 5,693,874 A | 12/1997 | De La Cruz et al. |
| 5,713,336 A | 2/1998 | King et al. |
| 5,826,428 A | 10/1998 | Blaschke |
| 5,860,277 A | 1/1999 | Schnaibel et al. |
| 5,899,062 A | 5/1999 | Jerger et al. |
| 5,974,787 A | 11/1999 | Lemire et al. |
| 5,974,788 A | 11/1999 | Hepburn et al. |
| 5,998,210 A | 12/1999 | Hepburn et al. |
| 6,071,113 A | 6/2000 | Tsubouchi et al. |
| 6,269,633 B1 | 8/2001 | Van Nieuwstadt |
| 6,298,729 B1 | 10/2001 | Locker |
| 6,301,875 B1 | 10/2001 | Backlund et al. |
| 6,378,359 B1 | 4/2002 | Dobson et al. |
| 6,382,182 B1 | 5/2002 | Green et al. |
| 6,490,858 B2 | 12/2002 | Barrett et al. |
| 6,586,254 B1 | 7/2003 | Kumar |
| 6,594,990 B2 | 7/2003 | Kuenstler et al. |
| 6,713,025 B1 | 3/2004 | Ivanescu |
| 2001/0054281 A1 | 12/2001 | Adams et al. |
| 2003/0012700 A1 | 1/2003 | Carnahan |
| 2003/0079520 A1 | 5/2003 | Ingalls et al. |
| 2004/0007056 A1 | 1/2004 | Webb et al. |
| 2004/0025580 A1 | 2/2004 | Webb et al. |
| 2004/0028588 A1 | 2/2004 | Webb et al. |
| 2004/0237636 A1 | 12/2004 | Bartley |

FOREIGN PATENT DOCUMENTS

| | | |
|---|---|---|
| DE | 3020030 | 12/1981 |
| EP | 0590699 A | 4/1994 |
| EP | 000895024 A2 | 2/1999 |
| EP | 000961013 A2 | 12/1999 |
| FR | 2674333 | 9/1992 |
| GB | 2329853 | 7/1999 |
| GB | 2356826 | 6/2001 |
| JP | 51-111927 | 10/1976 |
| JP | 56-49820 | 5/1981 |
| JP | 04-72410 | 3/1992 |
| JP | 06-264740 | 9/1994 |
| JP | 07-198127 | 8/1995 |
| JP | 11-159386 | 6/1999 |
| JP | 11-270808 | 10/1999 |

OTHER PUBLICATIONS

SAE Presents Automotive Systems Testing Toptec, Oct. 14-15, 1998, Novi, Michigan.

Southwest Research Institute Marketing Brochure, Fuel/Oil Catalyst Aging System, Feb. 1999.

Southwest Research Institute, Further Advances in Exhaust Aftertreatment, Promotional Brochure, Feb. 1994, San Antonio, Texas.

Webb et al., Development of a Methodology to Separate Thermal from Oil Aging of a Catalyst Using a Gasoline-Fueled Burner System, SAE Technical Paper 2003-01-0663, 2003, SAE International.

Jovanovic, Modified apparatus for the simulation of engine exhaust emissions, Goriva Maziva, 1984, pp. 33-38, vol. 23(1).

Casinhas et al., A Pyrolysis cell as simulator for an automobile catalytic converter, Vacuum, 1999, pp. 89-97, vol. 52, Elsevier Science Ltd.

Southwest Research Institute, Unique SwRI-developed procedures and analytical tools to assist vehicle manufacturers in meeting SULEV standards, Southwest Research Institute News, Feb. 23, 1998, Southwest Research Institute, San Antonio, Texas.

Hepburn, A Comparison Between the Combustion of Isooctane, Methanol, and Methane in Pulse Flame Combustors with Closed Loop A/F Control, SAE Technical Paper 920799, 1992, SAE International.

Webb et al., PC-Based Control of a Gasoline-Fueled Burner Aging Test Stand to Simulate Engine Exhaust, LabVIEW for Automotive, Telecommunications, Semiconductor, Biomedical, and other Applications, National Instruments Virtual Instrumentation Series, 2000, Prentice Hall.

Otto et al., A Laboratory Method for the Simulation of Automobile Exhaust and Studies of Catalyst Poisoning, Journal of the Air Pollution Control Association, Jun. 1974, vol. 24, No. 6.

Selby, Development and Significance of the Phosphorus Emission Index of Engine Oils, 13th International Colloquium Tribology—Lubricants, Materials, and Lubrication, 2002, pp. 1-9.

Ingalls et al., Development of Catalyst Poisoning Evaluation Procedure, 08-9920, Internal Research,& Development Program, Annual Report, 1996, p. 53, Southwest Research Institute, San Antonio, Texas.

Ingalls et al., Develop and Test an Apparatus to Evaluate Fuel and Lube Oil Effects on Automotive Catalysts, 08-9949, Internal Research & Development Program, Annual Report, 1996, pp. 53-54, Southwest Research Institute, San Antonio, Texas.

Webb et al., Catalyst Aging Evaluation with Exposure to 0.06 and 0.11 Percent Phosphorus Oils Using the FOCUS Burner System, JSAE 20030269, 2003, SAE 2003-01-1999, Society of Automotive Engineers, Inc.

Drury et al., The Effect of Lubricant Phosphorus Level on Exhaust Emissions in a Field Trial of Gasoline Engine Vehicles, SAE Technical Paper 940745, 1994, SAE International.

Ueda et al., Engine Oil Additive Effects on Deactivation of Monolithic Three-Way Catalysts and Oxygen Sensors, SAE Technical Paper 940746, 1994, SAE International.

Williamson, Catalyst Deactivation Due to Glaze Formation From Oil-Derived Phosphorus and Zinc, SAE Technical Paper 841406, 1984, SAE International.

Joy et al., Influence of Phosphorus on Three-Component Control Catalysts: Catalyst Durability and Characterization Studies, SAE Technical Paper 852099, 1985, SAE International.

Cully et al., The Impact of Passenger Car Motor Oil Phosphorus Levels on Engine Durability, Oil Degradation, and Exhaust Emission in a Field Trial, SAE Technical Paper 952344, 1995, SAE International.

Cully et al., The Impact of Passenger Car Motor Oil Phosphorus Levels on Automotive Emissions Control Systems, SAE Technical Paper 961898, 1996, SAE International.

Ball et al., Application of Accelerated Rapid Aging Test (RAT) Schedules with Poisons: The Effects of Oil Derived Poisons, Thermal Degradation, and Catalyst vol. on FTP Emissions, SAE Technical Paper 972846, 1997, SAE International.

Beck et al., Impact of Sulfur on the Performance of Vehicle-Aged Palladium Monoliths, Applied Catalysis B: Environmental 6, 1995, vol. 185-200.

Jobson et al, Spatially Resolved Effects of Deactivation on Field-Aged Automotive Catalysts, SAE Technical Paper 910173, 1991, SAE International.

Minutes—Oil Protection of Emission System Test II Task Force Held on Aug. 19, 1999, ASTM, Sep. 27, 1999. (Redacted).

Minutes—Oil Protection of Emission System Test II Task Force Held on May 23, 2000, ASTM, Jun. 8, 2000. (Redacted).

Minutes—Oil Protection of Emission System Test (OPEST) II Task Force Held Apr. 4, 2001, ASTM, May 2, 2001, San Antonio, TX. (Redacted).

International Search Report with Written Opinion, PCT/US05/28475, 10 pages, Nov. 21, 2006.

TESTING USING A NON-ENGINE BASED TEST SYSTEM AND EXHAUST PRODUCT COMPRISING ALTERNATIVE FUEL EXHAUST

PRIORITY DATA

The present application is a continuation-in-part of U.S. patent application Ser. No. 10/213,890, filed Aug. 6, 2002, now U.S. Pat. No. 7,140,874, incorporated herein by reference. This application is related to co-pending U.S. patent application Ser. No. 11/470,471 filed Sep. 6, 2006; U.S. patent application Ser. No. 11/420,393 filed May 25, 2006; U.S. patent application Ser. No. 11/326,983 filed Jan. 6, 2006; U.S. patent application Ser. No. 10/917,230 filed Aug. 12, 2004; U.S. patent application Ser. No. 10/917,245 filed Aug. 12, 2004; U.S. patent application Ser. No. 10/918,330 filed Aug. 12, 2004; U.S. patent application Ser. No. 10/847,034 filed May 17, 2004; U.S. patent application Ser. No. 10/458,023 filed Jun. 10, 2003; U.S. patent application Ser. No. 10/439,146 filed May 15, 2003, now U.S. Pat. No. 6,983,545 B2; and U.S. patent application Ser. No. 10/457,916 filed Jun. 10, 2003.

RELATED APPLICATIONS

The present application also is related to application Ser. No. 10/457,916, published Jan. 15, 2004 as US 2004-0007056 A1 (pending); application Ser. No. 10/439,146, published Feb. 12, 2004 as US 2004-0025580 A1 (pending); application Ser. No. 10/458,023, published Feb. 12, 2004 as US 2004-0028588 A1 (pending); and, application Ser. No. 10/847,034, filed May 17, 2004 (pending).

FIELD OF THE APPLICATION

The present application relates to a method and apparatus for producing simulated alternative fuel exhaust using a non-engine based test system.

BACKGROUND

Exhaust components, such as catalytic converters, are designed to treat exhaust produced when an internal combustion engine burns one or more specific fuel—typically gasoline or diesel fuel. Where the exhaust component will treat exhaust from the combustion of alternative fuel(s), the simulated exhaust must be produced by burning the alternative fuel(s). In order to produce a simulated alternative fuel exhaust using a bench engine, the bench engine generally must be modified to burn the alternative fuel.

Apparatus and methods are needed to accurately and cost effectively produce simulated alternative fuel exhaust.

SUMMARY

The present application provides a method for testing one or more test components. The method comprises: providing a non-engine based test system comprising a combustor in fluid communication with the one or more test components and supplying air and fuel to the combustor at an air to fuel ratio (AFR) and under feed conditions effective to produce a feedstream flowpath. The fuel comprises one or more alternative fuel which is gaseous at ambient conditions comprising atmospheric pressure and a temperature of about 20° C. or higher. Supplying air and fuel comprises feeding the one or more alternative fuel to a pressure regulator to produce one or more pressure regulated alternative fuel and feeding the one or more pressure regulated alternative fuel to the combustor. The method comprises combusting at least a portion of fuel in the feedstream flowpath under combustion conditions effective to produce an exhaust product comprising one or more alternative fuel exhaust, and exposing the one or more test components to the exhaust product under test conditions effective to produce one or more treated components.

The application also provides a test system comprising a non-engine combustor in fluid communication with a fuel supplier, an air supplier, and a test component, the fuel supplier comprising one or more pressurized fuel container in fluid communication with one or more pressure regulator in fluid communication with the combustor.

BRIEF DESCRIPTION

Exhaust aftertreatment devices, such as catalytic converters, perform optimally when treating exhaust produced burning specific fuel(s). Bench engines typically burn gasoline or diesel fuel to produce simulated exhaust for that specific fuel. In order to burn a different fuel, the bench engine may need to be modified, for example, to supply an adapter for feeding a gaseous fuel. See U.S. Pat. Nos. 5,713,336; 5,592,924; or 6,382,182, incorporated herein by reference. Other features of a bench engine that may require modification in order to burn alternative fuel(s) include but are not necessarily limited to spark timing, compression ratio, intake throttle, cooling, and engine structure itself.

The use of a bench engine to burn one or more fuel(s) other than its target fuel may cause autoignition, coking and/or cracking prior to injection, poor atomization, vaporization, and/or mixing of the fuel. For example, fuels with low viscosities may not provide sufficient lubrication for the precision fit of fuel injection pumps or injector plungers, resulting in leakage or increased wear. Fuel atomization also is affected by fuel viscosity.

The present application provides a non-engine based exhaust component rapid aging system (NEBECRAS) adapted to produce exhaust using one or more alternative fuels.

Non-engine Based Exhaust Component Rapid Aging System

Figure 1:
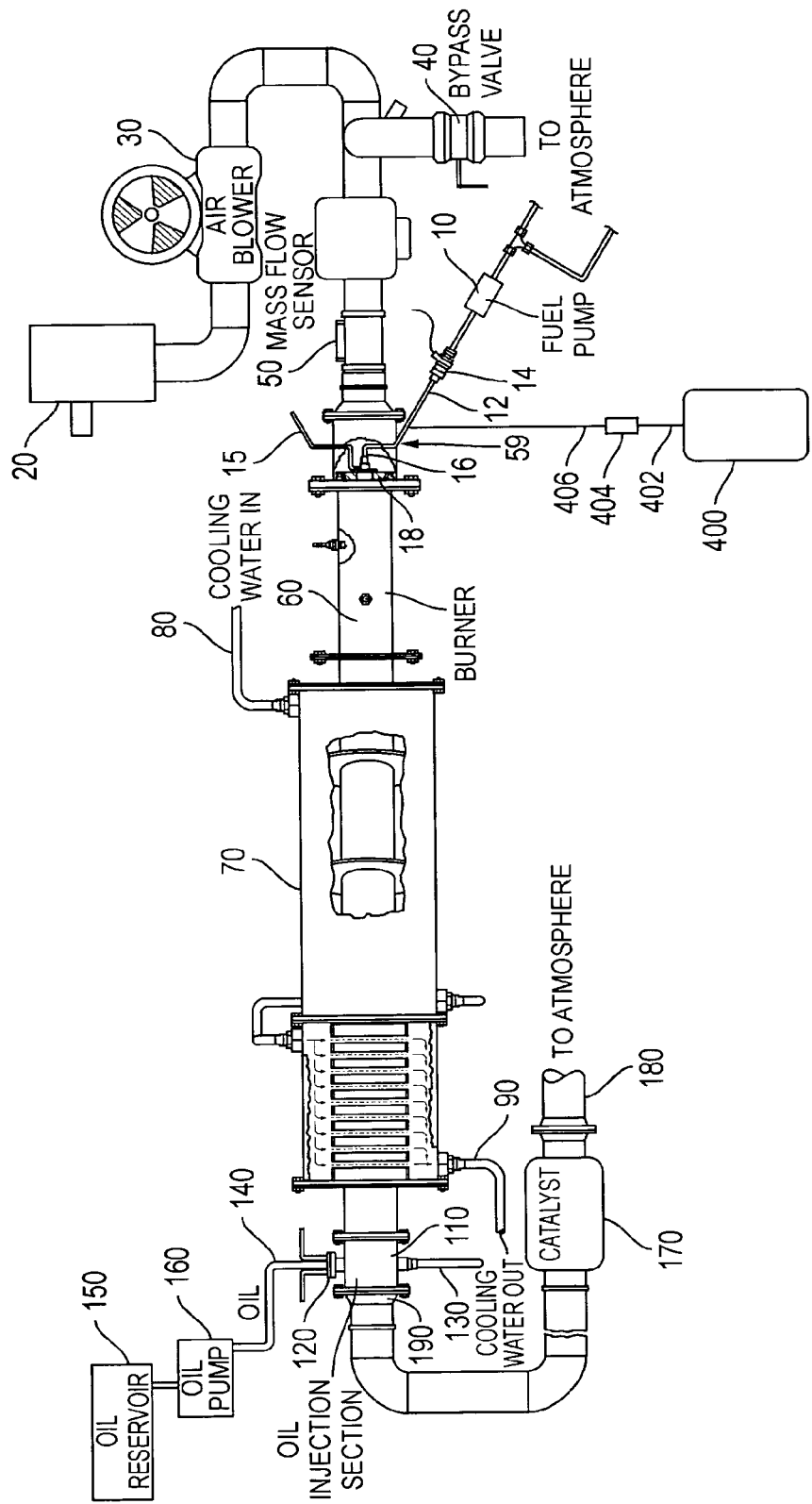
FIG. 1 is a schematic diagram of the FOCAS® rig, a preferred non-engine based exhaust component rapid aging system (NEBECRAS) for use herein, described in U.S. Patent Application Publication No. 20030079520, published May 1, 2003, incorporated herein by reference, which has been modified to include more than one fuel supplier.

U.S. Patent Application Publication No. 20030079520 describes a preferred NEBECRAS (the FOCAS® rig). The FOCAS® rig comprises: (1) an air supply system to provide air to the burner, (2) a fuel system to provide fuel to the burner, (3) a burner system to combust the air and fuel mixture and to provide the proper exhaust gas constituents, (4) a heat exchanger to control the exhaust gas temperature, (5) (optionally) an oil injection system, and (6) a computerized control system. The foregoing components are illustrated in FIG. 1 and described in detail in U.S. Patent Application Publication No. 20030079520 (incorporated herein by reference) and is not described further in detail. The FOCAS® rig uses an air atomized, orifice type injector, which can inject a variety of fuels. In a preferred embodiment, the NEBECRAS comprises more than one fuel container, with at least one fuel container comprising a pressure cylinder adapted to deliver a gaseous feed. The pressure container preferably communicates with the combustor via a pressure regulator and is suitable to deliver either gas or compressed gas to the combustor.

The FOCAS® rig was developed to evaluate the long term effects of individual variables on the long term performance of exhaust aftertreatment devices (i.e., a catalyst). The FOCAS® rig produces an exhaust product with a composition and temperature corresponding to that produced by an internal combustion engine of a motor vehicle burning the same fuel(s).

The burner system in the FOCAS® rig may be used to generate stoichiometric, rich, and lean hot gas conditions without substantial damage to the combustor. The burner system in the FOCAS® rig is effective to substantially stoichiometrically combust at least a portion of fuel in the feedstream flowpath without substantial damage to the combustor.

The combustor comprises a nozzle comprising a swirl plate which is effective even at a stoichiometric air to fuel ratio (AFR) of producing a feedstream flowpath comprising an air shroud effective to prevent flame from attaching to a nozzle supplying fuel and air to the combustor during combustion of fuel. The feedstream flowpath also preferably prevents flame from remaining in constant contact with an inner wall of the combustor during combustion of fuel.

Although the FOCAS® rig is a preferred NEBECRAS, any functional and effective non-engine based test system could be adapted for use in accordance with the principles described herein.

Substantially any test may be run using exhaust gas produced using alternative fuel(s) or a combination of alternative fuel(s) and liquid fuel(s). Examples of such tests include, but are not necessarily limited to aging, cold start simulation, drive cycle simulation, air-fuel ratio sweeps, light off tests, vibration tests, temperature profile tests, thermal stress tests, quench tests, shell deformation tests, and thermal cycle tests. The test conditions for the foregoing types of tests are described in more detail below. In order to perform such tests, the NEBECRAS generally is installed in place of a bench engine in a known test rig.

The NEBECRAS may be used to perform various tests on substantially any component. Preferred components are automotive components, preferably vehicle exhaust system components. A preferred component is a catalytic converter. Other such components include, but are not necessarily limited to EGR valves, EGR coolers, oxygen sensors, exhaust tubing, mufflers, turbochargers, and exhaust manifolds.

The FOCAS® rig is designed to burn gasoline (a liquid fuel) to produce exhaust gas. However, the FOCAS® rig also may be used to burn one or more alternative fuels, or a combination of alternative fuels, alone, or in combination with one or more liquid fuel(s) including, but not necessarily limited to gasoline and diesel fuel.

For purposes of the present application, the phrase "alternative fuels" refers to fuels which are gaseous at atmospheric pressure and at typical ambient temperatures. Atmospheric pressure is understood to be about 101.33 kilopascals and ambient temperature generally is from about 20° C. to about 25° C. "Alternative fuels" include, but are not necessarily limited to fuels in gaseous form and fuels in compressed gaseous form. Examples of alternative fuels include, but are not necessarily limited to natural gas, methane, ethane, propane, refinery gas, butane, natural gas liquid(s) (NGL), including but not necessarily limited to liquefied petroleum gas (LPG), liquified natural gas (LNG), compressed natural gas (CNG), and renewable fuels.

Refinery gas is a mixture of hydrocarbon gases (and often some sulfur compounds) produced in large-scale cracking and refining of petroleum, and typically comprises a mixture of several of hydrogen, methane, ethane, propane, butanes, pentanes, ethylene, propylene, butenes, pentenes, and small amounts of other components, such as butadiene.

A typical composition of CNG is:

| Typical Composition of CNG (% Volume) | |
|---|---|
| Methane | 91.9 |
| Ethane | 3.7 |
| Carbon Dioxide | 2.0 |
| Propane | 1.2 |
| i-Butane | 0.4 |
| i-Pentane | 0.2 |
| Nitrogen | 0.2 |
| n-Butane | 0.1 |

Natural gas liquids (NGL's) include, but are not necessarily limited to natural gasoline, typically comprising ethane or pentane and heavier components of the natural gas stream. LPG's are a subcategory of NGL's that are produced along with and extracted from natural gas. LPG's also are produced from the refining of crude oil. Commercial LPG generally comprise propane, butane, and butane-propane mixtures.

The alternative fuel(s) may be combusted alone, or in combination with liquid hydrocarbon fuel. The NEBECRAS simulates the effects of additives and contaminants from liquid and/or alternative fuels on engine exhaust components.

FIG. 1 illustrates a standard FOCAS® rig (a preferred NEBECRAS) which has been modified to include an additional fuel container 400 for providing alternative fuel. The FOCAS® rig includes a standard automotive fuel pump 10 for pumping fuel through the fuel line 12 to an electronically actuated fuel control valve 14 then to the burner 60. A variety of burn ratios may be simulated, including but not necessarily limited to substantially continuous stoichiometric combustion of fuel, rich-burn (insufficient oxygen concentration to fully combust the fuel) and lean-burn (more oxygen than is required to fully combust the fuel). Under typical test conditions, the FOCAS® rig is programmable to produce exhaust that is passed directly to the exhaust component. If desired, the FOCAS® rig provides substantially continuous and effective stoichiometric combustion for 200 hours or more without the need for maintenance. In a preferred embodiment, the burner may run substantially continuously at stoichiometric for at least 1500 hours with minimal maintenance.

The burner is specially fabricated, as described below to produce stoichiometric combustion of the fuel and air. In a preferred embodiment, the burner 60 is a swirl stabilized burner capable of producing continuous stoichiometric combustion of automotive fuel.

In a preferred embodiment the burner comprises a plenum chamber and a combustion tube. A swirl plate 18 separates the plenum chamber from the combustion tube. The combustion tube is constructed of material capable of withstanding extremely high temperatures. Preferred materials include, but are not necessarily limited to INCONEL or stainless steel, and optionally can be equipped with a quartz tube in place of the INCONEL tube for visual observation of the resulting flame pattern.

The air and fuel are separately introduced into the burner 60. Air from the mass flow sensor 50 is ducted to the plenum chamber, then through the swirl plate 18 into the burner tube. The swirl plate 18 is equipped with a fuel injector 16.

In a first embodiment, an air assisted fuel spray nozzle 16 is engaged using conventional means at the center of the swirl plate 18 inside of the plenum chamber. Fuel from the fuel supply line 14 is fed to the air assist fuel spray nozzle 16, where it is mixed with compressed air from air line 15 and sprayed into the combustion tube. The compressed air line 15 provides high pressure air to assist in fuel atomization.

In a preferred embodiment, the feed system is adapted to meter and supply at least one alternative fuel(s). At least one supplemental fuel container 400, preferably a pressure cylinder 400 is provided in fluid communication with the fuel injector. In one embodiment, the pressure cylinder 400 is adapted to maintain the alternative fuel at greater than atmospheric pressure, such as at a pressure effective to maintain the material contained in the pressure cylinder as a fluid other than a gas, such as a liquid.

The operation of the NEBECRAS using an alternative fuel will be described with reference to compressed natural gas (CNG). However, the description also is applicable to other alternative fuels. Where the alternative fuel is CNG, the high pressure cylinder 400 is adapted to maintain the CNG at a pressure of from about 2400 to about 3600 psi. The CNG travels from the high pressure cylinder 400 through the high pressure fuel line 402 to a pressure regulator 404. Although it is preferred to provide a pressure regulator, a pressure regulator is not required to feed uncompressed gaseous material. Where the alternative fuel is compressed, as with CNG, the pressure is reduced, preferably to a reduced pressure of about 60–70 psi or less. The reduced pressure alternative fuel travels through a reduced pressure line 406 to a fuel line 12.

In one embodiment, the NEBECRAS burns only gaseous fuel. In this embodiment, the fuel pump 10 and liquid fuel supply is replaced by a high pressure cylinder 400, a high pressure fuel line 402, the pressure regulator 404, and a reduced pressure fuel line 406 which feeds directly to the fuel injector 16.

In another embodiment, the NEBECRAS is adapted to burn alternative fuel and/or liquid fuel. In this embodiment, the NEBECRAS includes the fuel pump 10 and the liquid fuel supply. The reduced pressure fuel line 406 fluidly communicates with the fuel line 12 downstream of the fuel pump 10. The fuel, whether reduced pressure alternative fuel, liquid fuel, or a combination thereof, flows through the fuel line 12 to the fuel injector 16.

The NEBECRAS data acquisition and control software controls test parameters simultaneously throughout operation, and is programmable to simulate any desired set of test conditions. In a preferred embodiment the data acquisition and control system is also capable of controlling a number of parameters, including controlling the lube oil injection and burner systems. The software program uses measured data to calculate total exhaust flow and burner air to fuel ratio, and to check conditions indicative of a system malfunction. The burner air to fuel ratio may be controlled as either open or closed loop, maintaining either specified fuel flow or specified air to fuel ratio. Air to fuel ratio control is achieved by varying the rate of fuel delivered to the burner (modifying the pulse duty cycle of a fixed frequency control waveform). Open loop control can be activated allowing the operator to enter a fixed fuel injector pulse duty cycle. Closed loop control can be activated in which the actual burner air to fuel ratio is measured and compared to the measured value of the air to fuel setpoint and then adjusting the fuel injector duty cycle to correct for the measured error. The front panel of the program is used to allow the user to input a preferred test cycle, and to run the test using a single screen.

The FOCAS® rig may be deactivated, the system may be cooled to ambient conditions in a matter of minutes, and then immediately after cooling (if desired), the system can be used to perform additional testing. The FOCAS® rig offers improved repeatability and reduced cool down time. The FOCAS® rig also offers relatively easy maintenance compared to internal combustion engines, which require periodic maintenance (oil changes, tune-ups) and time consuming repairs. The FOCAS® rig is relatively simple (with less moving parts and friction areas) and can operate with improved fuel economy when operated lean. These advantages make it highly desirable as a research and development tool.

Accelerated Aging Tests-"Rat-A Cycle Conditions"

The method and apparatus herein is useful for accelerated aging using one or more alternative fuel(s). Thermal aging of a catalytic converter can be efficiently accelerated because the rate at which thermal deactivation of a catalytic converter occurs can be increased by operating at higher catalyst temperature. "Accelerated aging conditions" generally involve combinations of elevated catalyst inlet temperatures, chemical reaction-induced thermal excursions (simulating misfire events), and average air/fuel ratio's (AFR's) effective to accelerate aging of a test component. The "RAT-A cycle" refers to the combination of conditions in the General Motors "Rapid Aging Test Cycle." One hundred hours of aging on the GM RAT-A cycle is generally understood to demonstrate a level of durability.

The RAT-A cycle is characterized mainly by steady-state, stoichiometric operation with short thermal excursions. The thermal excursions are created by operating rich, to generate about 3 percent carbon monoxide (CO), while injecting secondary air (about 3 percent oxygen, $O_2$) in front of the catalyst. The excess reductants and oxidants react in the catalyst, releasing the chemical energy in the form of heat. The catalyst inlet temperature and exhaust gas flow rates are also used to specify the test cycle setup. The flow is specified in standard cubic feet per minute (scfm), typically 75 scfm. C. Webb and B. Bykowski, "Development of a Methodology to Separate Thermal from Oil Aging of a Catalyst Using a Gasoline-Fueled Burner System" SAE 2003-01-0663, incorporated herein by reference.

On the engine, adjusting engine speed sets up the flow specification. The gas temperature at the inlet to the catalyst is achieved by adjusting engine load (throttle position) during the steady-state, stoichiometric portion of the cycle. The thermal excursion is created by adjusting engine operating AFR during the rich portion of the cycle, and adjusting air injection to achieve the 3 percent CO and $O_2$ specification. The table (below) provides the setup conditions for the cycle. It should be noted that the catalyst inlet temperature is specified during the stoichiometric portion of the cycle, but that the exhaust gas concentrations to create the exotherm (and not catalyst inlet temperature) are specified during the thermal excursion portion of the cycle. The two specifications create a thermal profile within the catalyst.

Aging Cycle Specifications:

| Mode No. | Description | Parameter Specification | Mode Length, sec |
|---|---|---|---|
| 1 | Closed-loop, Stoichiometric | Inlet Temperature = 800° C. | 40 |
| 2 | Open-loop, Fuel rich | 3% CO to catalyst | 6 |
| 3 | Open-loop, Fuel Rich with Air Injection | 3% CO, 3% $O_2$ to catalyst | 10 |
| 4 | Closed-loop, Stoichiometric with Air Injection | Stoichiometric out of engine, continue air injection | 4 |

Drive Cycle Simulation Tests "FTP-75 Conditions"

The method and apparatus also is useful to perform drive cycle tests using one or more alternative fuels. During drive cycle conditions, all of the following conditions are varied to simulate actual driving: exhaust flowrate, exhaust gas temperature, and exhaust gas stoichiometry. FTP-75 conditions include:

1) varying the exhaust flowrate, preferably in the range of from 0 to about 200 standard cubic feet per minute (scfm), to simulate the exhaust flowrates of the test vehicle throughout the FTP;
2) varying the exhaust gas temperature, preferably in the range of from about 20 to about 900° C., to simulate the exhaust gas temperatures at the catalyst inlet throughout the FTP; and,
3) varying the exhaust gas stoichiometry, preferably in the range of from about 10 to about 40 AFR, more preferably from about 10 to about 20 AFR, to simulate the exhaust gas stoichiometry of the vehicle throughout the FTP.

The system exhaust gas mixture ideally contains similar concentrations of hydrocarbons, carbon monoxide, and oxides of nitrogen as seen in the vehicle exhaust at any time during the FTP test.

Substantially any component may be tested using the method and apparatus of the present application. Preferred components are automotive components, preferably vehicle exhaust system components. A preferred component is a catalytic converter. Other suitable components include, but are not necessarily limited to EGR valves, EGR coolers, oxygen sensors, exhaust tubing, mufflers, turbochargers, and exhaust manifolds.

The non-engine based test system, preferably a FOCAS® system, may be deactivated, the system may be cooled to ambient conditions in a matter of minutes, and then immediately after cooling, the system can be used to perform additional testing.

Simulated Cold-Start

The system also is useful to perform simulated cold-start using alternative fuel(s). To perform the simulated cold-start, the test component preferably is a catalytic converter, and the catalyst is at a temperature sufficiently low to simulate cold start. Suitable temperatures are 100° C. or less. Preferably, the simulation either is begun with the catalyst at a bed temperature of about 70° C. or less, preferably less than 70° C., or is cooled to such a temperature using any suitable cooling arrangement known to persons of ordinary skill in the art. In a preferred embodiment, the catalyst is cooled using an air blower. In order to efficiently cool the catalyst using an air blower, the air blower is set at an initial flow rate effective to cool the catalyst to the desired temperature within a reasonable period of time. Preferably, the air blower is set at an initial flow rate of 40 standard cubic feet per minute (scfm) or more, more preferably 50 scfm. The air flow is directed onto the catalyst until the desired temperature is reached.

With the burner off and the blower on, raw oil is injected from about 2 to about 15 seconds, preferably about 4 seconds. The burner is then lit, and preferably programmed into a rich warm-up mode. A rich warm-up mode for most engine types is an air:fuel ratio (AFR) of from about 9:1 to about 14:1, preferably about 13.75:1. Thereafter, oil injection is continued for a period of time effective to simulate the flow of lubricating oil to the catalytic converter upon cold start of the given engine type, preferably about 20 seconds or more, more preferably about 22 seconds. Thereafter, oil injection is halted and the rich warm-up mode is continued for a period of time effective to prevent excess build-up of unburned oil on the face of the catalyst, preferably for about 20 seconds or more, more preferably for about 60 seconds. The targeted oil injection rate during the cold start simulation is from about 10 to about 40 grams/hour, preferably from about 28 to about 30 grams/hour. The cycle preferably is repeated a sufficient number of times to simulate the effect of cold start aging. In a preferred embodiment, the number of cycles is from about 1 to about 60,000, preferably from about 35,000 to about 40,000.

If the catalyst is in a cool state (preferably 70° C. or less), then it is not necessary to cool the catalyst. However, if the catalyst is at a higher temperature, the catalyst is cooled before initiating cold start simulation. In order to accomplish this cooling, the air blower suitably is set at an initial flow rate of 40 scfm or more, preferably 50 scfm, until the catalyst is cooled to about 70° C. or less. Once the catalyst is at the desired initial temperature, preferably about 70° C. or less, oil is injected into the blowing air for several seconds. The oil injection system control can be programmed into the computer. The system also can be programmed to inject more or less oil, depending upon the system to be simulated. The targeted oil injection rate in the cold start simulation procedure is from about 10 to about 40 grams/hour, preferably from about 28 to about 30 grams/hour.

After the burner is lit, oil injection at the targeted oil injection rate is continued for about 20 seconds or more, preferably for about 22 seconds, while a fuel rich mode is simulated. Thereafter, oil injection is halted.

The burner is lit after the initial, relatively cool oil injection sequence of several seconds. The burner preferably is programmed into a fuel rich mode. A fuel rich mode generally comprises an AFR of 12.5:1 or more, preferably 13.75:1. After the burner is lit, oil injection is continued for about 20 seconds or more, preferably 22 seconds. Thereafter, oil injection is halted and the fuel rich mode is permitted to continue for a period of time effective to prevent excess build-up of unburned oil on the face of the catalyst. The fuel rich mode generally is continued for a period of time of about 20 seconds or more, preferably for about 60 seconds.

During cold start simulations, the spark igniters are activated after the initial "cold" injection of raw lubricating oil is complete. The computer can be programmed to assure proper ignition time substantially immediately after the initial oil injection flow of from about 2 to about 15 seconds, preferably about 4 seconds. Once lit, the burner 60 and the fuel injector 16 work together to provide substantially continuous and effective stoichiometric combustion.

Other Tests

The NEBECRAS also may be used to perform other tests using alterative fuel(s). Such tests generally comprise:
(a) varying one or more operating condition selected from the group consisting of temperature, time interval between changes in temperature, air-fuel ratio, and combinations thereof; and,
(b) varying one or more other conditions while maintaining substantially constant one or more operating conditions selected from the group consisting of temperature, air-fuel ratio, and combinations thereof.

The following is a specific description of a number of tests falling in categories (a) and (b). The description is illustrative only, and should not be construed as limiting the claims to preferred embodiments:
a) Varying an operating condition selected from the group consisting of temperature, time interval between changes in temperature, air-fuel ratio, and a combination thereof:

Tests in category (a) include, but are not necessarily limited to design verification tests, including durability tests. Such tests may comprise one or more different parameter compared to accelerated aging and drive cycle testing. Examples of a "different parameter" include, but are not necessarily limited to parameters selected from the group consisting of reduced maximum temperature, shorter intervals between temperature cycles, enhanced magnitude temperature cycling, multiple repetitions of the foregoing types of cycling, and combinations thereof. In a preferred embodiment, the reduced maximum temperature is 850° C. or less, preferably 500° C. or less.

Specific examples of tests in category (a) include, but are not necessarily limited to shell deformation testing, temperature profile testing, thermal cycling, light-off testing, and air-fuel ratio sweeps. The foregoing tests are described in more detail below:

Shell Deformation Testing

A catalytic converter generally is constructed such that a catalyst carrier is encased within a shell. The monolithic catalyst carrier generally is formed of ceramic, which is brittle and tends to be readily damaged. In order to prevent damage, the catalyst generally is elastically supported within the shell.

The present application provides a method for evaluating the tendency of the shell to expand, generally called shell deformation tests, using a non-engine based test system operated using one or more alternative fuel(s). In a shell deformation test, a catalytic converter (330 in FIG. 1) comprising a container in fluid communication with the hot exhaust gas generated by the NEBECRAS, preferably a FOCAS® rig, is exposed to several heat-up and cool-down periods. In other words, the alternate stress conditions comprise exposing the component to exhaust gas at a first temperature for a first period of time and exposing the component to exhaust gas at a second temperature for a second period of time. The first temperature is sufficiently different than the second temperature to evaluate the dynamic and permanent response of the component (preferably comprising a catalytic converter and shell) to the first and second temperature.

Temperature Profile Testing

Temperature profile testing entails exposing the component(s) to high-temperature (steady-state) step increases, preferably under steady AFR and flow rate conditions, in order to acquire internal (catalyst) and external (can surface) thermal gradient information. The alternate conditions generally comprise incrementally increasing the temperature of the exhaust product to produce the thermal gradient conditions, although the temperature also may be incrementally decreased. In other words, the catalytic converter is exposed to exhaust product comprising alternative fuel exhaust at a first temperature for a first period of time, then at a second temperature for a second period of time, then at a third temperature for a third period of time, and so on. The component is evaluated using known methods to determine the external and internal impact of exposure to the resulting thermal gradient.

Thermal Cycling

The present application also uses a NEBECRAS to generate exhaust product comprising alternative fuel exhaust for thermal cycling tests.

Thermal cycling severely stresses the test component by rapidly and repeatedly changing the test component temperature. The test component, preferably a catalytic converter, is exposed to exhaust product comprising alternative fuel exhaust at a first temperature for a first period of time, and then at a second temperature for a second period of time, and so forth. The first temperature and the second temperature are sufficiently different to thermally stress the component.

Thermal cycling also tests the durability of a monolithic catalyst when exposed to exhaust product comprising alternative fuel exhaust. Conventional ceramic monolithic catalysts generally consist of a ceramic support with a coating upon which the catalyst is actually deposited. In order to obtain substantial density and strength, the ceramic material normally must be fired at a high temperature. Such high-temperature firing necessarily sinters the ceramic material, producing a very small surface area. Consequently, the ceramic must be coated with another material having a higher surface area, as well as specific chemical characteristics required for deposit of the catalyst. The high surface area coating or "washcoat" and the underlying ceramic material generally have different thermal expansion coefficients. When the component is exposed to the foregoing thermal cycling, the high surface area coating may tend to flake off of the underlying ceramic support.

Air-Fuel Ratio Sweeps

The application provides a method in which a NEBECRAS is used as the exhaust gas generator and heat source during air-fuel ratio sweeps using alternative fuel(s). In order to assess catalytic conversion at different AFR's, exhaust components are measured while the AFR is adjusted from lean to rich (or vice versa). In stepped AFR sweep tests, each AFR is maintained until steady-state operation is achieved. In continuous AFR sweep tests, AFR is continuously adjusted at a predetermined rate.

(b) Varying one or more other conditions while maintaining substantially constant one or more operating conditions selected from the group consisting of temperature, air-fuel ratio, and combinations thereof;

Tests in category (b) typically are durability tests, which evaluate the physical integrity of the component(s) exposed to exhaust gas produced using alternative fuel(s). In such tests, the alternate conditions generally comprise heat, via the exhaust gas, and comprise additional stress conditions other than thermal stress. Examples of additional stress conditions include, but are not necessarily limited to, exposure to liquid, exposure to vibration, exposure to acceleration or acceleration force, change in component orientation, repetitive exposure to any of the foregoing, and combinations thereof. Hot vibration testing and quench testing are exemplary, and are described in more detail below:

Hot Vibration Testing

Figure 2:
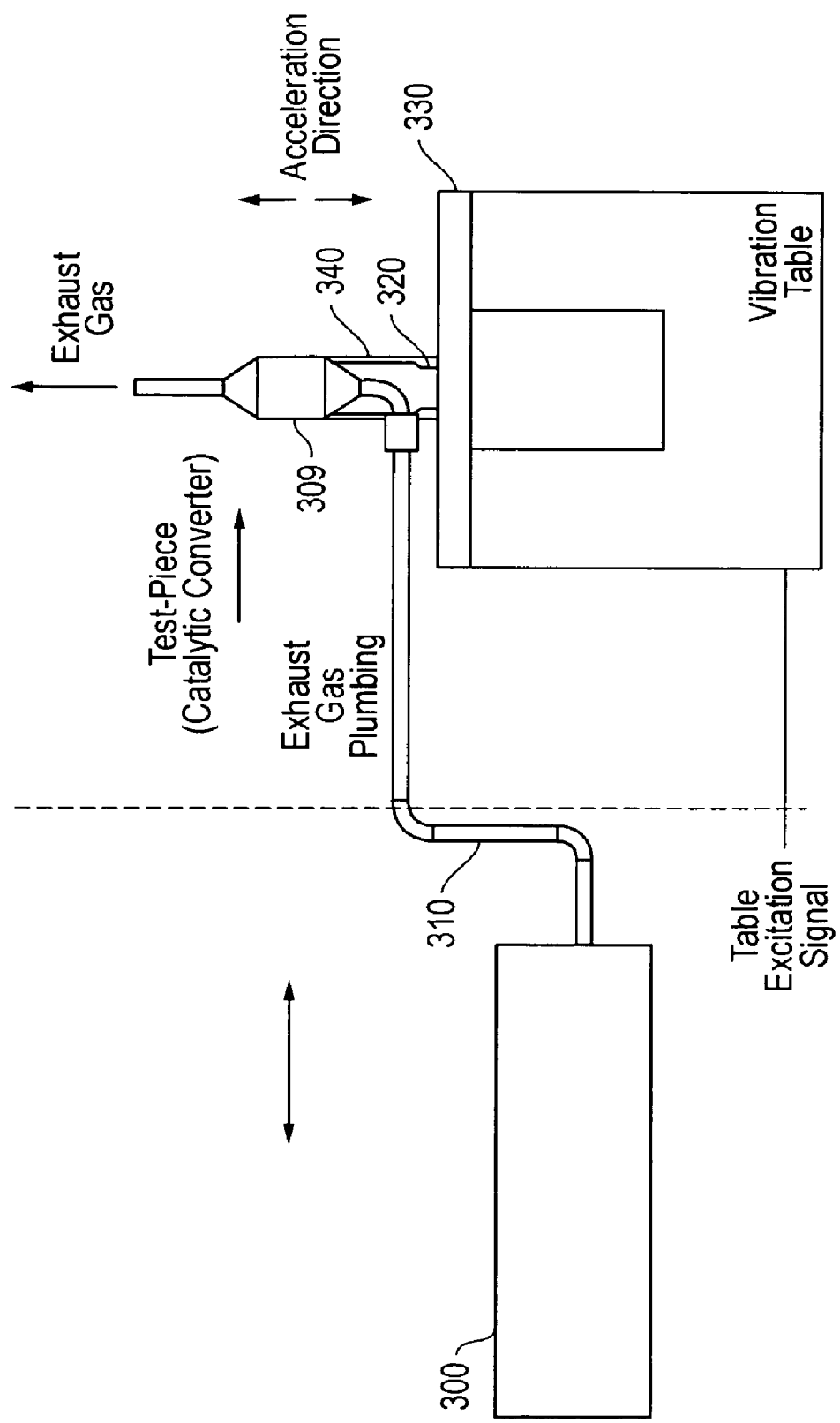
FIG. 2 is a box diagram of a system for performing hot vibration testing.

In hot vibration testing, the FOCAS® rig or other NEBECRAS is substituted for a gasoline engine or other heating apparatus in a known hot vibration testing rig, such as that described in U.S. Pat. No. 6,298,729, incorporated herein by reference. Referring to FIG. 2, the exhaust product comprising alternative fuel exhaust generated by the NEBECRAS 300 fluidly communicates with the test fixture 320 via plumbing 310. The apparatus is in mechanical communication with a vibration generator 330, preferably via a slip joint 340. The component(s) 330 are placed in the test fixture 320 in mechanical communication with the vibration generator 330, preferably a vibration table, which fluidly communicates 310 with the hot exhaust gas generated by the NEBECRAS, preferably a FOCAS® rig. In a preferred embodiment, the test component(s) are fastened to a shaker table which is sealingly engaged with exhaust gas plumbing 310 via a slip joint 340. The shaker table and/or fixtures appended thereto are adapted to provide vertical, horizontal, and angled component orientations. The component(s) are subjected to extended periods of exposure to vibration and steady-state or transient hot exhaust gas flow.

In a preferred embodiment, the component is fixed to a shaker table and exposed to exhaust product comprising alternative fuel exhaust. The vibration table is activated to vibrate at a predetermined vibration frequency and amplitude, and the acceleration of the component is determined by a detector in rigid attachment to the component (not shown). The amplitudes of the excitation energy simulate the range of motion that the component would encounter on an actual vehicle. The input amplitudes of the applied vibration may be increased to accelerate test severity, and the frequency distribution of the vibration may be set to match exhaust system vibration conditions for a particular motor vehicle or for particular vehicle operating conditions.

The forces transferred across the component are detected by a load cell and collected and analyzed as testing progresses. In general, the forces transmitted to the component during each test will decrease over time in approximate proportion to the number of vibration cycles to which the component is exposed.

The vibration generator may have any suitable structure. See, e.g., U.S. Pat. No. 6,672,434; U.S. Patent Application Publication 20040025608, incorporated herein by reference.

Water Quench Testing

Water quench testing simulates conditions when the catalytic converter of a vehicle is exposed to water as, for example, when the vehicle drives through a puddle or a flooded area. In water quench tests, the component is exposed to exhaust product comprising alternative fuel exhaust at relatively constant temperature, but the component surface is rapidly cooled with water. The water may be fresh or saltwater, and may comprise contaminants.

The rig used to perform water quench tests will include a liquid feed member in fluid communication with a source of liquid and with the test component surface, preferably a catalytic converter surface. The liquid feed member is activated during the test to expose the surface to the water, either a single time or repeatedly. In a preferred embodiment, the liquid feed member, preferably a nozzle or manifold apparatus, is effective to spray the surface of the component with water. The component is then evaluated using known methods to assess the impact of the surface cooling on the component.

As seen above, preferred alternate conditions include, but are not necessarily limited to repetitive heating and cooling periods, stepwise temperature increases, rapid changing of temperature, exposure to external water, sweep tests using gradually increased air to fuel ratios, and combinations thereof.

Persons of ordinary skill in the art will recognize that many modifications may be made to the present application without departing from the spirit and scope of the application. The embodiment described herein is meant to be illustrative only and should not be taken as limiting the application, which is defined in the claims.

We claim:

1. A burner-based system for producing exhaust that simulates exhaust produced by an internal combustion engine, for delivery of the exhaust to an emissions control device, comprising:
   a burner system having at least a burner for receiving air and fuel having an air-fuel ratio and for combusting fuel to produce simulated engine exhaust;
   wherein the burner is operable to receive and combust gaseous alternative fuel;
   wherein the burner further has a plenum chamber and combustion tube separated by a swirl plate, such that the air travels through the swirl plate;
   an orifice type fuel injector for supplying the fuel to the burner via a fuel supply line;
   an exhaust line for carrying the exhaust from the burner to the emissions control device;
   a heat exchanger for cooling the exhaust gas downstream the burner;
   a blower for providing forced air to the swirl plate; and
   a computerized control system operable to simulate a number of engine cycles, each cycle having a succession of engine operating modes.

2. The system of claim 1, wherein the fuel injector is an air-assisted fuel injector and wherein the burner is operable to receive and combust atomized liquid fuel and/or gaseous fuel via the same fuel supply line.

3. The system of claim 1, further comprising a liquid injector for injecting liquid substances into the exhaust line.

4. The system of claim 1, wherein at least one of the operating modes is a thermal excursion mode.

5. The system of claim 4, wherein the thermal excursion mode is accomplished by providing the burner with a rich air-fuel ratio and providing supplemental oxygen into the exhaust line immediately upstream the emissions control device.

6. The system of claim 1, wherein the operating modes further include at least the following modes: steady state stoichiometric and rich.

7. The system of claim 1, wherein the operating modes further include at least the following modes: steady state stoichiometric and lean.

8. The system of claim 1, wherein the operating modes further include at least the following modes: steady state stoichiometric and cold start.

9. The system of claim 1, wherein at least one of the modes is a cooling mode accomplished by cooling the emissions control device with the blower.

10. A method for simulating aging of an emissions control device in the exhaust line of an internal combustion engine, comprising:
    providing a burner system having at least a burner for receiving air and fuel having an air-fuel ratio and for combusting a fuel feedstream to produce simulated engine exhaust; wherein the burner is operable to receive and combust gaseous alternative fuel; wherein the burner further has a plenum chamber and combustion tube separated by a swirl plate, such that the air travels through the swirl plate; an orifice type fuel injector for supplying the fuel to the burner via a fuel supply line; an exhaust line for carrying the exhaust from the burner to the emissions control device; a heat exchanger for cooling the exhaust gas downstream the burner; and a blower for providing forced air to swirl plate;

placing the emissions control device on the exhaust line downstream the heat exchanger; and simulating a number of engine cycles, using a computerized control system, each cycle having a succession of engine operating modes.

11. The method of claim 10, wherein at least one of the modes is a thermal excursion mode.

12. The method of claim 11, wherein the thermal excursion mode is achieved by providing the burner with a rich air-fuel ratio and providing supplemental oxygen into the exhaust line immediately upstream the emissions control device.

13. The method of claim 10, wherein at least one of the modes is a cooling mode accomplished by cooling the emissions control device with the blower.

14. The method of claim 10, wherein the operating modes further include at least the following modes: steady state stoichiometric and rich.

15. The method of claim 10, wherein the operating modes further include at least the following modes: steady state stoichiometric and lean.

16. The method of claim 10, wherein the operating modes further include at least the following modes: steady state stoichiometric and cold start.

17. The method of claim 10, further comprising providing an injector for injecting substances into the exhaust line downstream the burner and upstream the emissions control device.

18. The method of claim 10, wherein the drive cycle includes varying the exhaust flowrate in a range within 0 to 200 standard cubic feet per minute.

19. The method of claim 10, wherein the drive cycle includes varying the exhaust gas temperature in a range within 20 to 900 degrees centigrade.

20. The method of claim 10, wherein the drive cycle includes varying the exhaust gas stoichiometry in a range within 10 to 40 AFR.

* * * * *